United States Patent [19]
Matsuo

[11] Patent Number: 6,112,996
[45] Date of Patent: *Sep. 5, 2000

[54] IC CARD AND AUTONOMOUS RUNNING AND WORKING ROBOT HAVING AN IC CARD MOUNTING APPARATUS

[75] Inventor: Takashi Matsuo, Amagasaki, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/867,360

[22] Filed: Jun. 2, 1997

[30] Foreign Application Priority Data

Jun. 3, 1996 [JP] Japan .................................. 8-140320

[51] Int. Cl.[7] .................................................. G06K 19/06
[52] U.S. Cl. ........................... 235/492; 235/486; 361/737
[58] Field of Search .................................... 235/492, 486, 235/495, 482, 451; 361/737, 752

[56] References Cited

U.S. PATENT DOCUMENTS

| | | | |
|---|---|---|---|
| 4,855,779 | 8/1989 | Ishikawa et al. | 354/412 |
| 4,975,805 | 12/1990 | Schmutzler | 361/399 |
| 5,049,728 | 9/1991 | Rovin | 235/492 |
| 5,208,450 | 5/1993 | Uenishi et al. | 235/492 |
| 5,309,592 | 5/1994 | Hiratsuka | 15/49.1 |
| 5,315,478 | 5/1994 | Cadwell et al. | 361/727 X |
| 5,430,617 | 7/1995 | Hsu | 361/818 |
| 5,526,233 | 6/1996 | Hayakawa | 361/737 |
| 5,563,400 | 10/1996 | Le Roux | 235/486 |
| 5,612,532 | 3/1997 | Iwasaki | 235/492 |
| 5,625,534 | 4/1997 | Okaya et al. | 361/737 X |
| 5,663,553 | 9/1997 | Aucsmith | 235/492 |
| 5,673,180 | 9/1997 | Pernet | 361/737 X |
| 5,677,524 | 10/1997 | Haghiri-Tehrani | 235/492 |

FOREIGN PATENT DOCUMENTS

| | | |
|---|---|---|
| 0282954 | 9/1988 | European Pat. Off. . |
| 0549983 | 7/1993 | European Pat. Off. . |
| 0-635-801-A2 | 1/1995 | European Pat. Off. . |
| 2613510 | 10/1988 | France . |
| 2-651-592-A1 | 3/1991 | France . |
| 4040 770 A1 | 6/1992 | Germany . |
| 62-28892 | 2/1987 | Japan . |
| 214393 | 1/1990 | Japan . |
| 5-12513 | 1/1993 | Japan . |
| 5233887 | 9/1993 | Japan . |

Primary Examiner—Michael G Lee
Attorney, Agent, or Firm—McDermott, Will & Emery

[57] ABSTRACT

An IC card includes an electronic circuit and a case protecting the electronic circuit, and the case has a through hole. An IC card mounting apparatus for mounting the IC card has a member with a notch at a position exposing the through hole of the IC card when the IC card is mounted. Accordingly, an IC card and an IC card mounting apparatus can be provided which allow reduction in size of the IC card mounting apparatus and easy take out of the IC card from the IC card mounting apparatus.

14 Claims, 24 Drawing Sheets

FIG. 24A
FIG. 24B
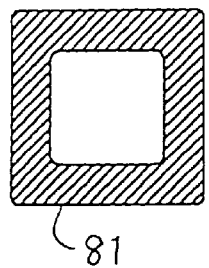
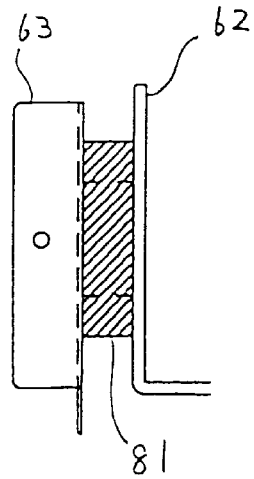
(A)
(B)
FIG. 25A
FIG. 25B
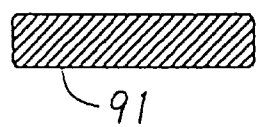
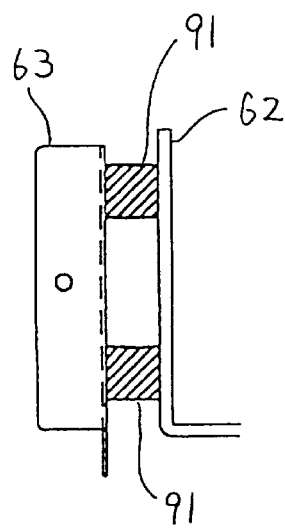
(A)
(B)

IC CARD AND AUTONOMOUS RUNNING AND WORKING ROBOT HAVING AN IC CARD MOUNTING APPARATUS

BACKGROUND OF THE INVENTION

1. Field of the Invention

The present invention relates to an IC card and an IC card mounting apparatus.

2. Description of the Related Art

An autonomous running and working robot having an IC card mounting portion on its body to which an IC card storing data such as order of working procedure is mounted, for performing prescribed working by reading the data stored in the IC card has been proposed. When IC cards having different contents corresponding to different rooms are prepared, for example, cleaning of the different rooms can be performed optimally by the robot.

When the IC card is removed from the body of the autonomous running and working robot, an ejecting mechanism formed by a take out lever provided at the IC card mounting portion, for example, is utilized.

The autonomous running and working robot which is required of working at every corner even in a small space must have as small a body as possible. The IC card mounting portion of the robot body should also be made as small as possible. Further, even when it is reduced in size, the IC card must be taken out easily from the robot body.

Further, use of the autonomous running and cleaning robot in a clean room of a hospital, for example, is expected. The IC card should surely be taken out even in such a situation where the user wears a pair of gloves.

SUMMARY OF THE INVENTION

Therefore, an object of the present invention is to provide an IC card which allows reduction in size of the IC card mounting apparatus and which can be readily taken out from such IC card mounting apparatus that is reduced in size.

Another object of the present invention is to provide an IC card mounting apparatus which is reduced in size and allows easy removal of the IC card from the IC card mounting apparatus.

The above described object of the present invention can be attained by the IC card of the present invention including an electronic circuit having a semiconductor memory, and a plastic case having a thin card-shape with a through hole, protecting said electronic circuit.

Since the IC card is contained in a plastic case protecting the electronic circuit and has a through hole, the IC card can be surely and readily removed by inserting one's finger through the hole and pulling the card out. Accordingly, it becomes unnecessary to provide an ejecting mechanism at the IC card mounting apparatus. Therefore, the IC card mounting apparatus can be reduced in size, and the IC card can be readily taken out from the IC card mounting apparatus.

According to another aspect of the present invention, the apparatus to which an IC card is mounted includes a mounting opening to which an IC card having an electronic circuit having a semiconductor memory and a thin card-shape plastic case with a through hole for protecting said electronic circuit is mounted, a communicating mechanism for reading information stored in the IC card, and a mounting portion at which the through hole is exposed when the IC card is mounted.

In the apparatus on which the IC card is mounted in accordance with the present invention, the through hole of the IC card is exposed when the card is mounted on the IC card mounting apparatus. By inserting one's finger through the through hole of the IC card and pulling the card out, the IC card can be removed. Therefore, it becomes unnecessary to provide an ejecting mechanism at the IC card mounting apparatus, and therefore the apparatus can be made smaller and the IC card can be readily taken out from the IC card mounting apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 24A and 24B show a second example of the structure of the coupling unit for the autonomous running and working robot.

FIGS. 25A and 25B show a third example of the structure of the coupling member of the autonomous running and working robot.

DESCRIPTION OF THE PREFERRED EMBODIMENTS

Figure 1:
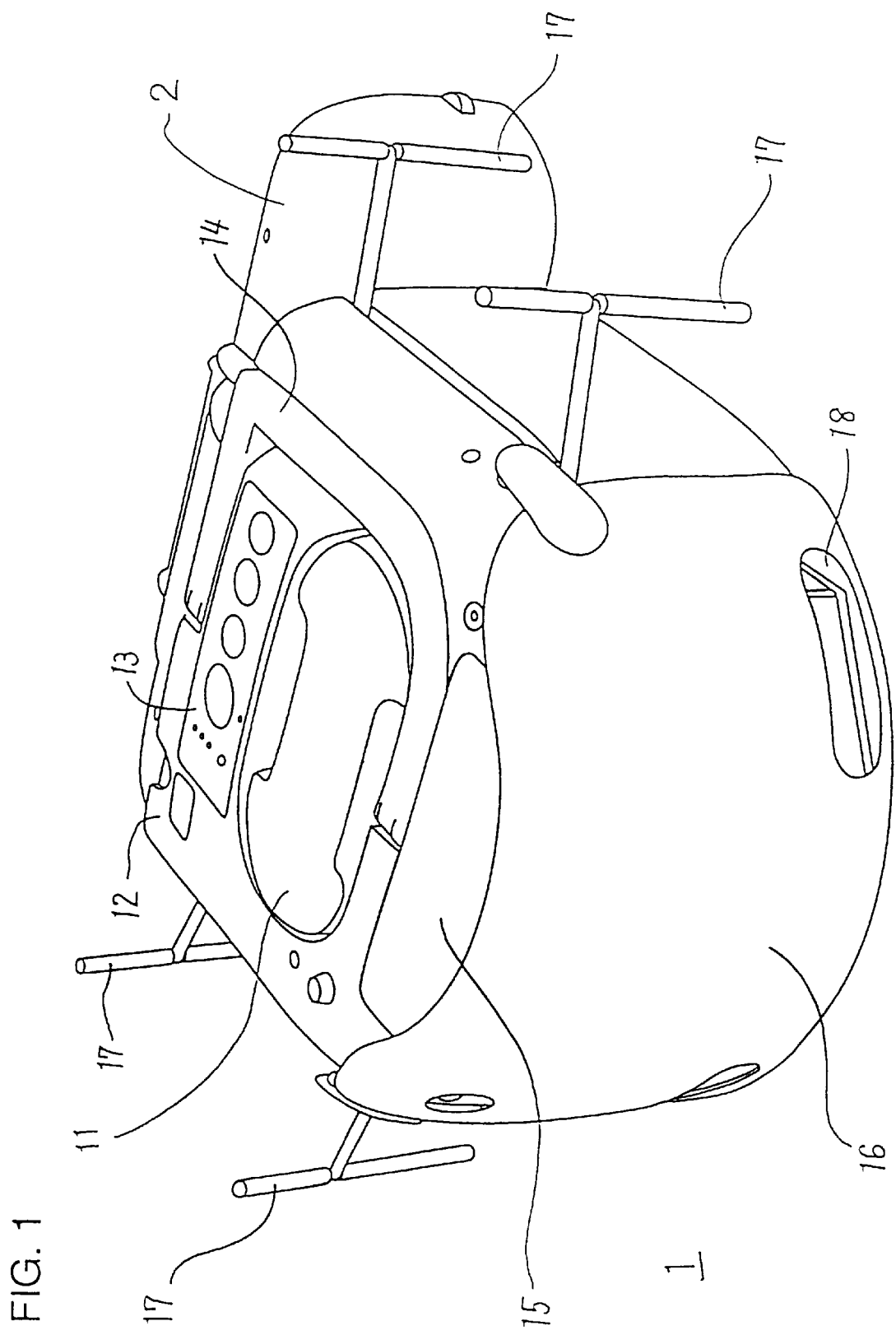
FIG. 1 is a perspective view showing an overall structure of an autonomous running and working robot.
Figure 2:
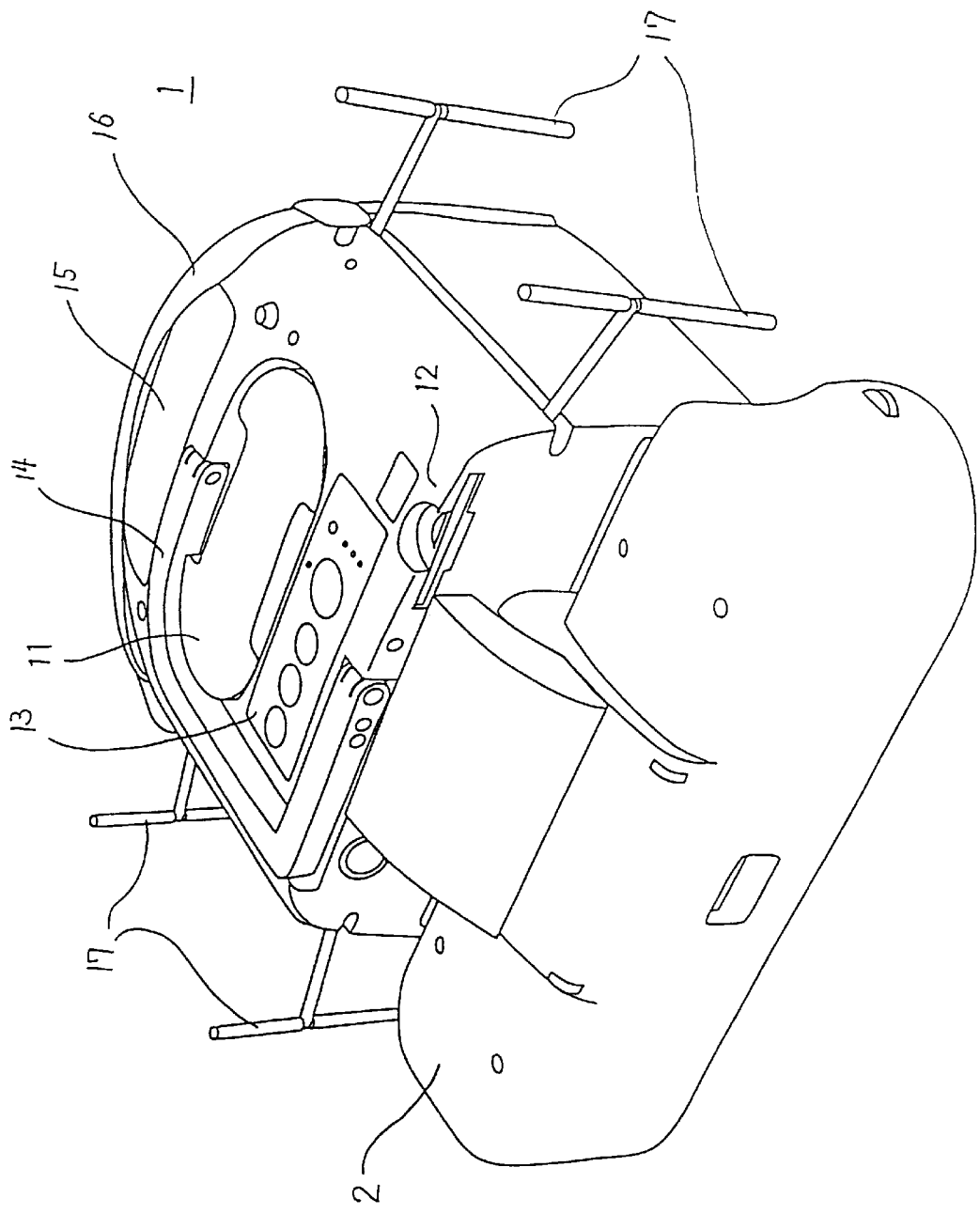
FIG. 2 is a rear perspective view showing an overall structure of the autonomous running and working robot.

The autonomous running and working robot in accordance with the embodiments of the present invention will be described with reference to the Figures.

The autonomous running and working robot in accordance with the embodiment of the present invention may be used for various applications. As an example, an autonomous running and working robot for cleaning and waxing will be described in detail.

Referring to FIGS. 1, 2, 3 and 4, the autonomous running and working robot includes a body 1 and a working unit 2. Body 1 includes a tank 11, an IC card mounting portion 12, an operation panel 13, a handle 14, a battery 15, a bumper sensor 16, a touch sensor 17 and a distance measuring window 18.

Figure 4:
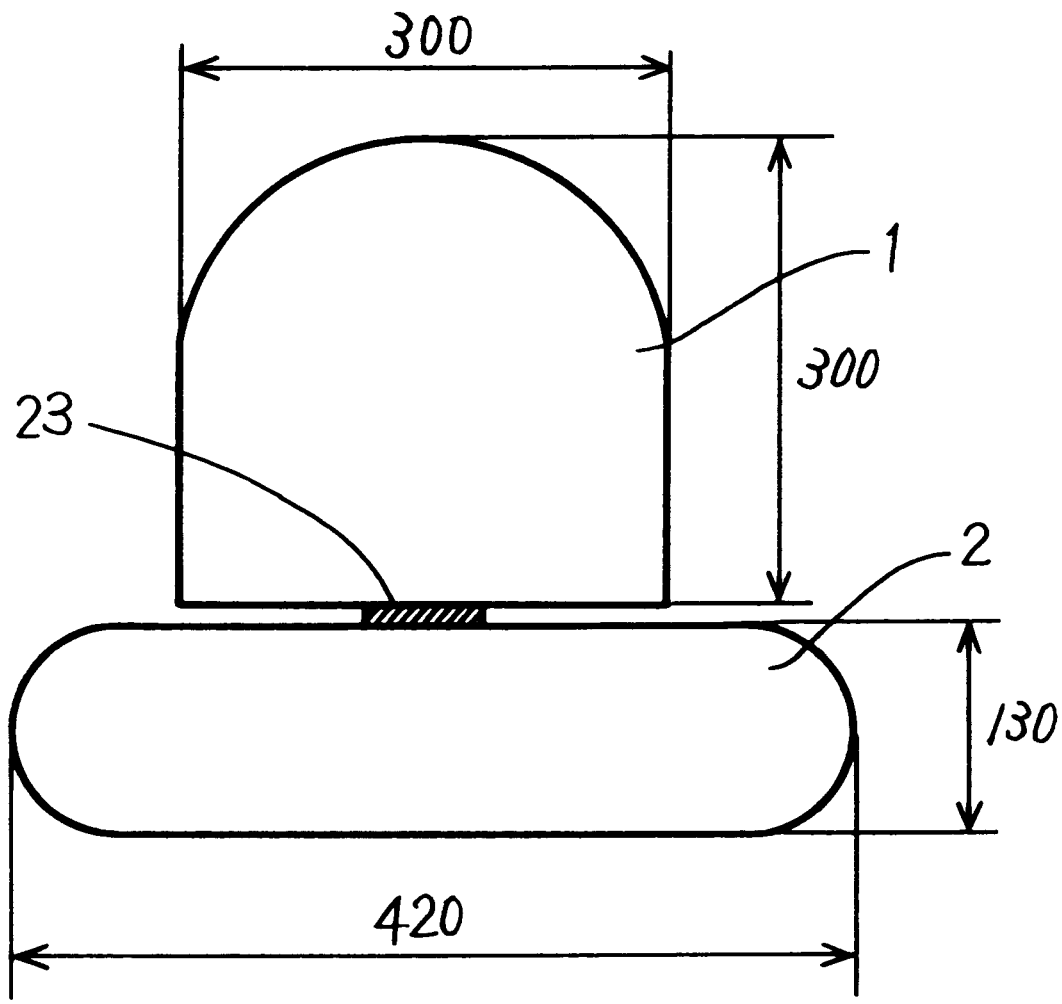
FIG. 4 is a plan view showing structures of the body, the working unit and the coupling unit of the autonomous running and working robot.

Liquid such as water, detergent or wax is contained in tank 11. The liquid contained in tank 11 is fed to working unit 2 by a pump (not shown) through a hose (not shown). Working unit 2 is supported movable in the left and right directions of body 1 by a sliding mechanism (not shown). Working unit 2 is driven in the left and right directions by means of the sliding mechanism (not shown) by a motor. On a side surface of body 1, touch sensor 17 for detecting an obstacle is provided. As shown in FIG. 4, the size of body 1 is about 300 mm×300 mm, while the size of working unit 2 is about 420 mm×130 mm. The weight of working unit 2 is about 1500 g.

Figure 5:
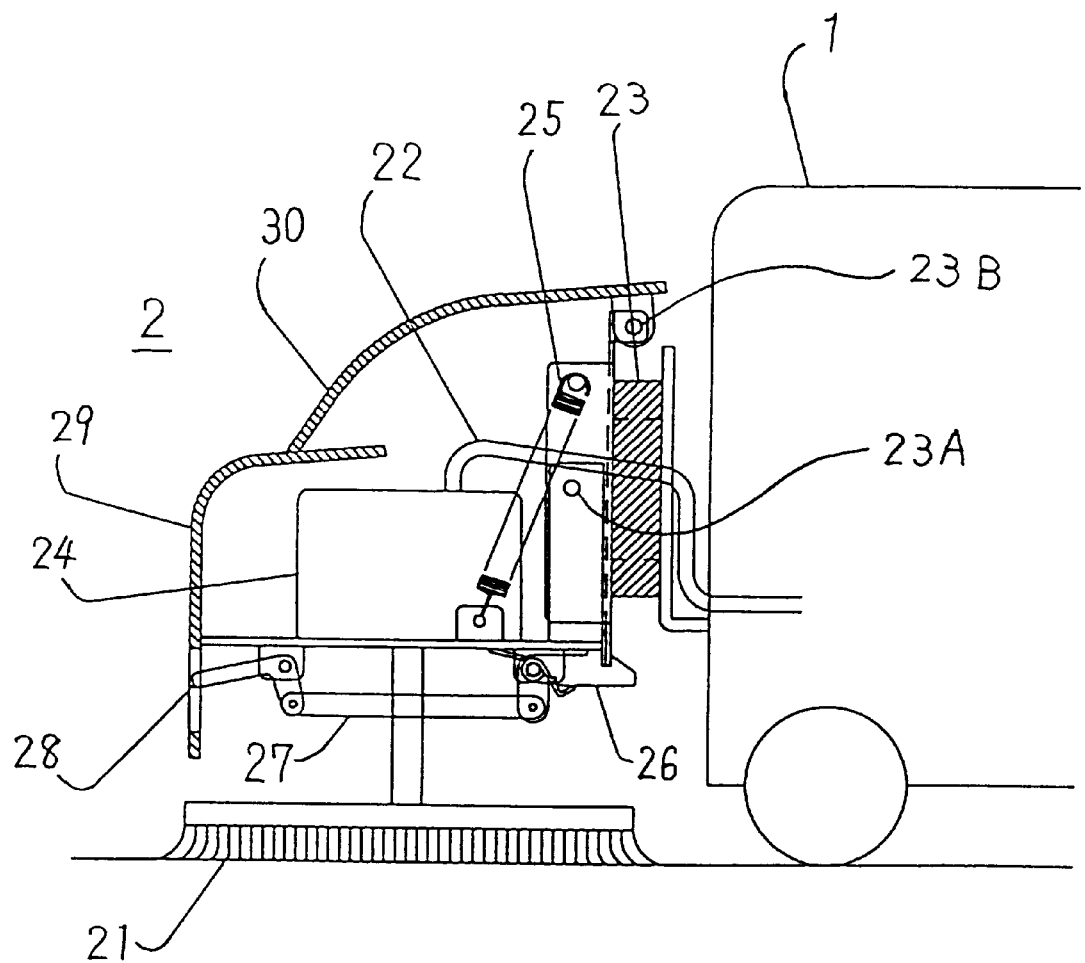
FIG. 5 is a cross section showing a structure of the working unit of the autonomous running and working robot.

The working unit 2 shown in FIGS. 1 to 4 will be described in greater detail. FIG. 5 is a cross section showing the structure of working unit 2 shown in FIGS. 1 to 4.

Referring to FIG. 5, working unit 2 includes a brush 21, a nozzle (not shown), a hose 22, a coupling member 23, a brush driving motor 24, a spring 25, a lock member 26, a coupling arm 27, a lock canceling lever 28, a first cover 29 and a second cover 30.

Figure 3:
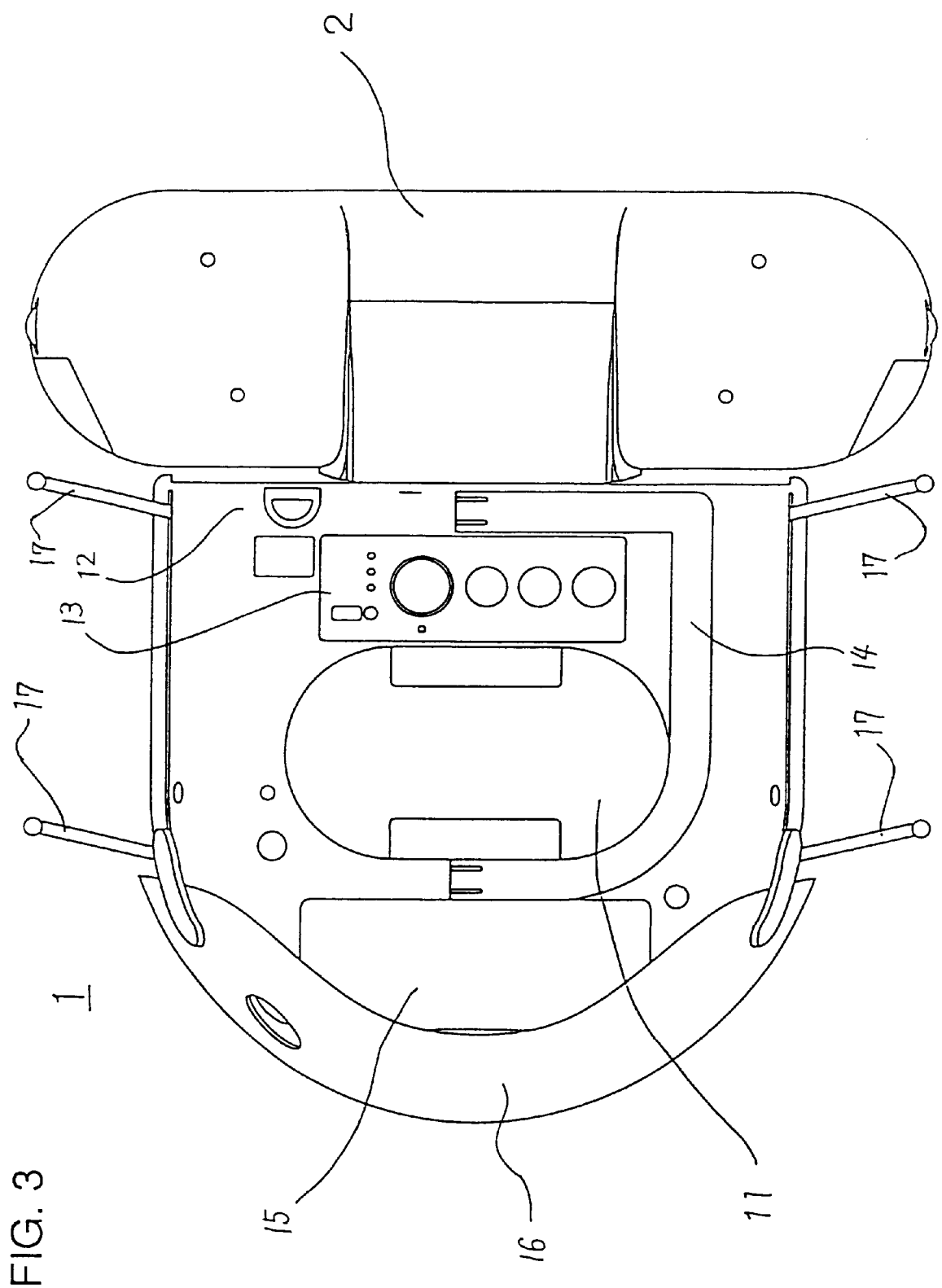
FIG. 3 is a plan view showing the overall structure of the autonomous running and working robot.

Four brushes 21, which will be described later, are rotatably attached to the lower portion of working unit 2. Near each brush 21, a nozzle for jetting liquid pushed out by the pump through four distributed hoses is provided. The four brushes 21 are coupled to a rotary axis of brush driving motor 24 by a coupling mechanism, not shown, and rotary driven by brush driving motor 24. In order to widen the working area which is to be cleaned and waxed by four brushes 21, the working width by the four brushes 21 is made wider than the body 1 of the working unit, as shown in FIG. 3.

Working unit 2 is rotatably supported at a fulcrum 23A of coupling member 23 and urged upward by spring 25. Working unit 2 is locked at coupling member 23 by lock member 26 at a lowermost rotatable position. Lock member 26 is releasably coupled to lock canceling lever 28 by means of coupling arm 27. The first cover 29 protects inside of working unit 2 and is fixed on working unit 2 in such a shape that has a notch to avoid abutting against coupling member 23 and body 1 at the time of rotation. The second cover 30 is rotatably fixed on a fulcrum 23B of coupling member 23 at a position abutting the first cover 29. The first cover 29 also serves as a touch sensor.

Figure 6:
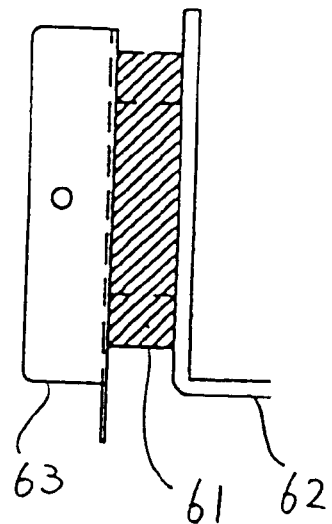
FIGS. 6 and 7 show first example of the structure of the coupling member of the autonomous running and working robot.
Figure 7:
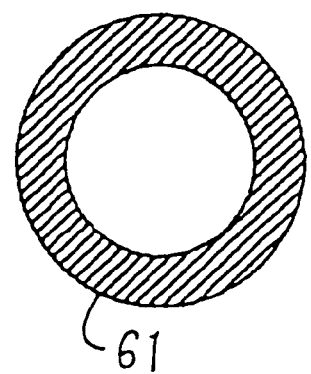

Referring to FIGS. 6 and 7, coupling member 23 shown in FIG. 5 will be described in greater detail. FIGS. 6 and 7 show a first example of the structure of the coupling member.

Referring to FIGS. 6 and 7, coupling member 23 includes a buffer member 61 and support members 62 and 63. Buffer member 61 has a ring shape. Support members 62 and 63 have holes of approximately the same size as the hole of buffer member 61 at the corresponding positions, so that coupling member 23 come to have a through hole at this portion. The ring of buffer member 61 has an outer diameter of about 52 mm, inner diameter of about 40 mm and thickness of about 5.4 mm.

Since buffer member 61 has a ring-shape, it can absorb uniformly the shock and external force in every direction. The through hole at the center may be used for arranging pipes such as hose 22 or wires, as will be described later.

Figure 8:
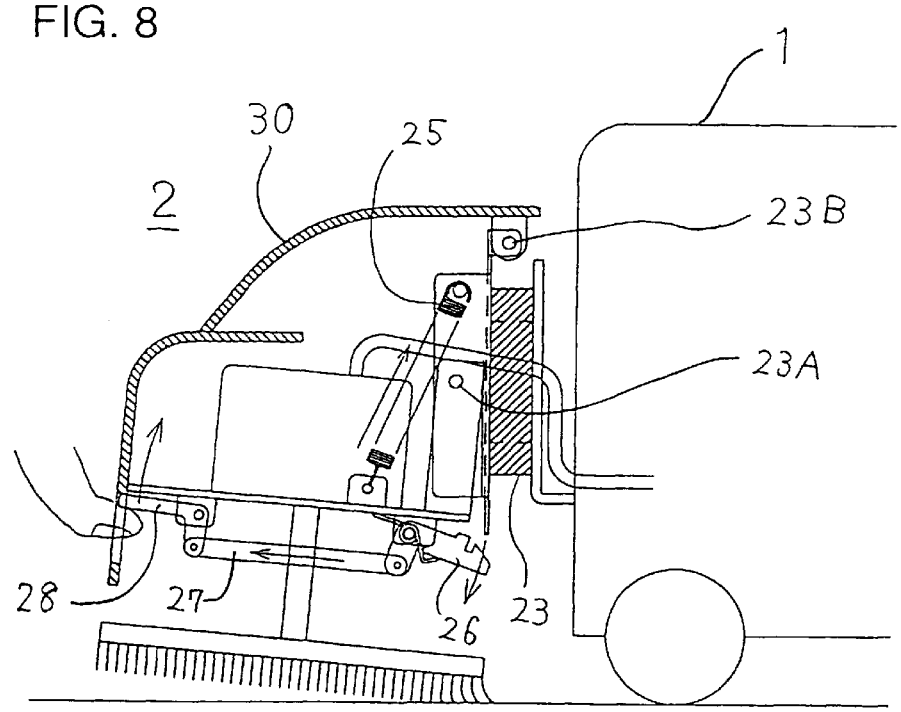
FIGS. 8 and 9 are cross sections showing operations of the working unit and the coupling member of the autonomous running and working robot.
Figure 9:
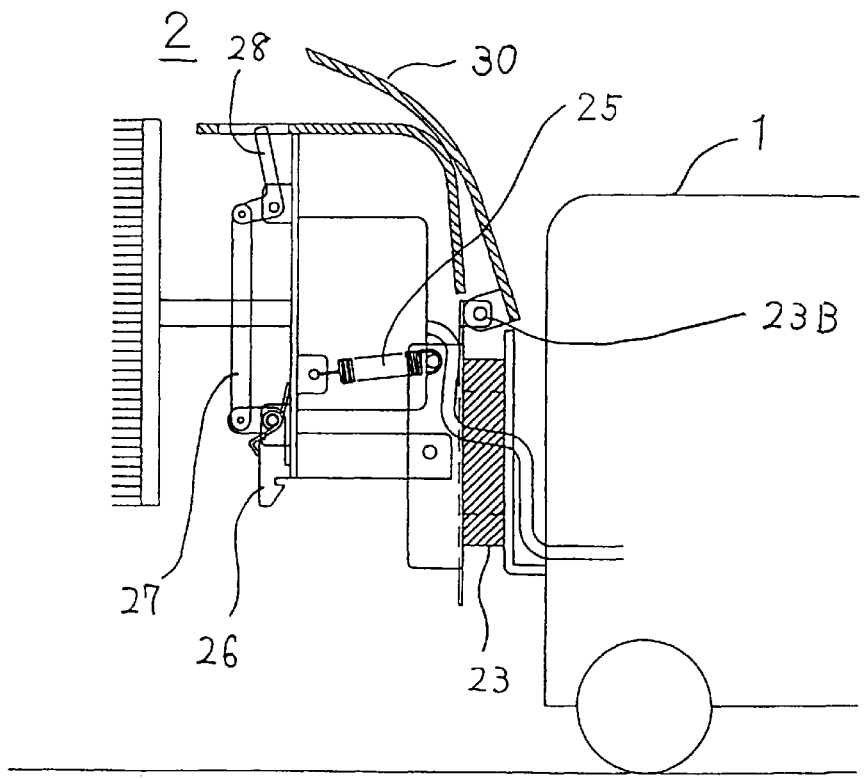

Referring to FIGS. 8 to 13, the operation of working unit 2 coupled by coupling member 23 to body 1 will be described. FIGS. 8 and 9 are cross sections showing the operation of the working unit and the coupling member of the autonomous running and working robot in accordance with the present embodiment. FIGS. 10 to 13 are perspective views showing the operation of the working unit of the autonomous running and working robot in accordance with the present invention.

Referring to FIGS. 5, 8 and 9, when lock canceling lever 28 is pushed up, lock member 26 rotates through coupling arm 27, and locking on coupling member 23 is canceled (FIG. 8). Working unit 2 rotates upward by about 90° about fulcrum 23A by the spring force of spring 25. Namely, it springs upward.

The second cover 30 for covering the notch of the first cover at working unit 2 is also rotated about fulcrum 23B provided at coupling member 23 together with the spring up of working unit 2, and hence it also springs upward.

FIGS. 10 to 13 are perspective views showing the operation of working unit 2. Elements common to those described with reference to FIG. 5 are denoted by the same reference characters and detailed description thereof is not repeated.

Figure 10:
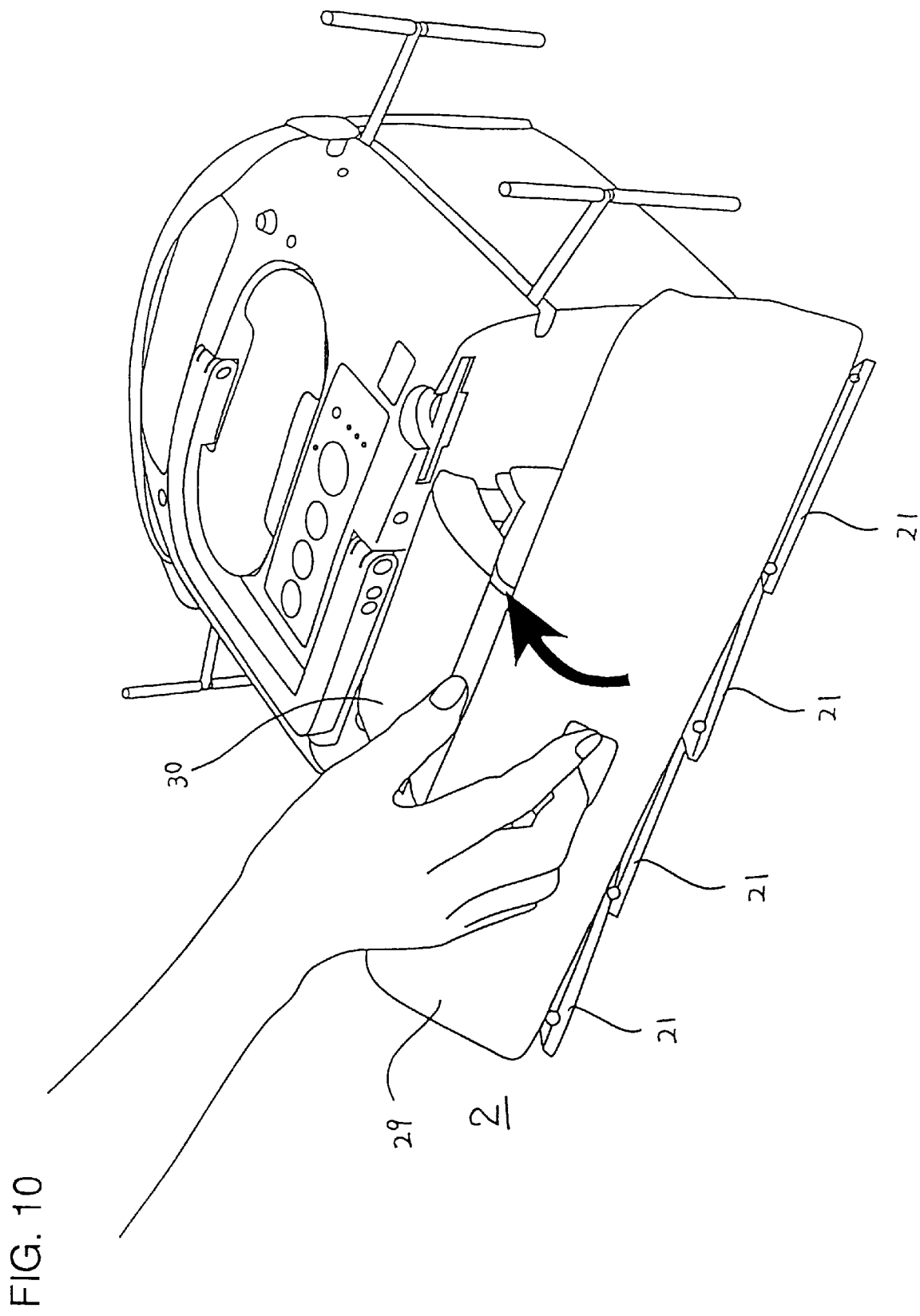
FIGS. 10 to 13 are perspective views showing operations of the working unit of the autonomous running and working robot.

Referring to FIG. 10, when lock canceling lever 28 (FIG. 11) in the first cover 29 is pushed up by an operator, lock member 26 is released, and by the spring force of spring 25, the working unit 2 including rotary brush 21 and the first cover 29 rotates upward. Accordingly, the second cover 30 also rotates upward.

Figure 11:
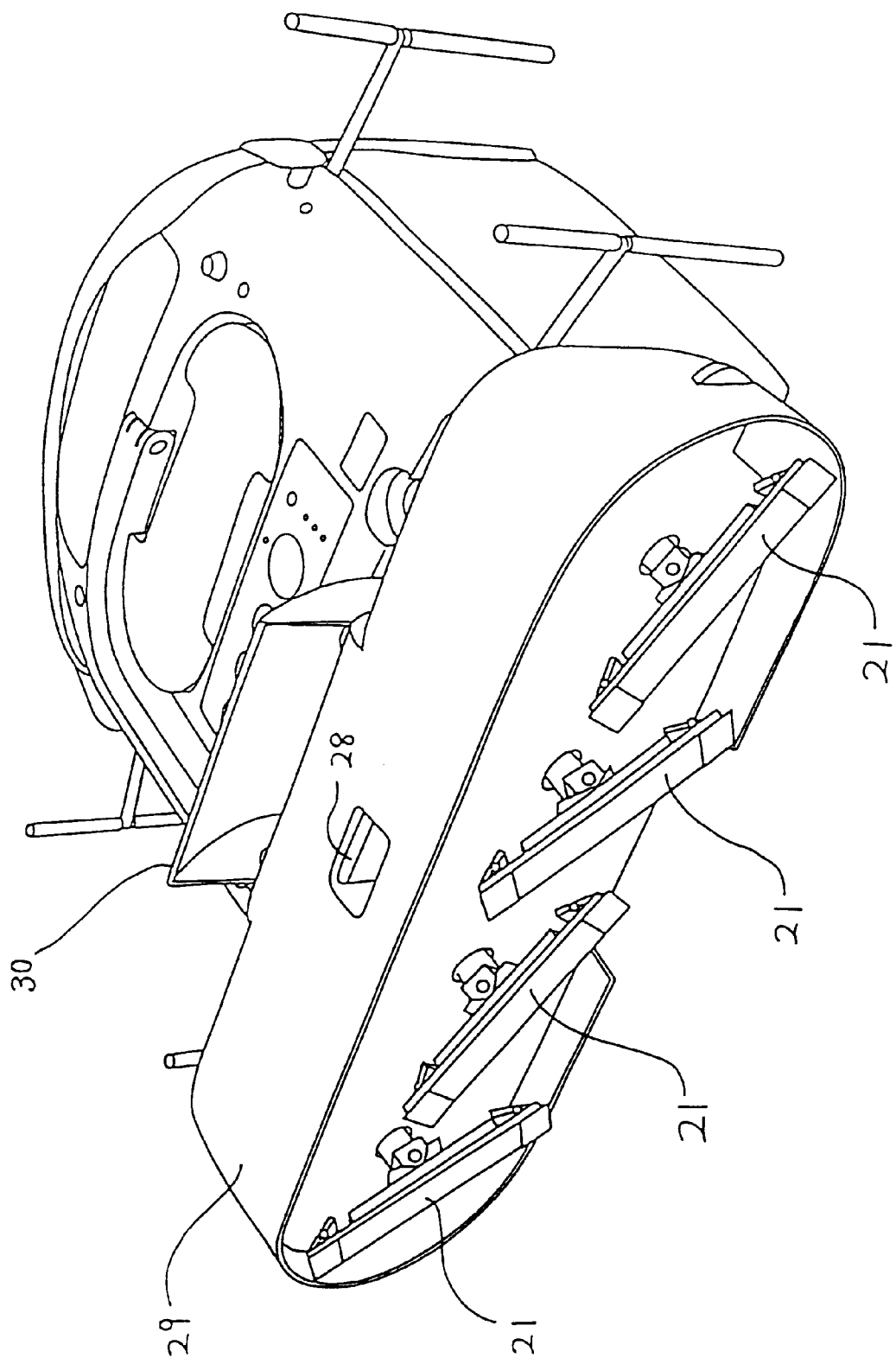

Referring to FIG. 11, as working unit 2 rotates upward, rotary brush 21 attached on the bottom surface of working unit 2 including first cover 29, second cover 30 and lock canceling lever 29 is exposed. Here, a rotary cloth for waxing is used as rotary brush 21.

Figure 12:
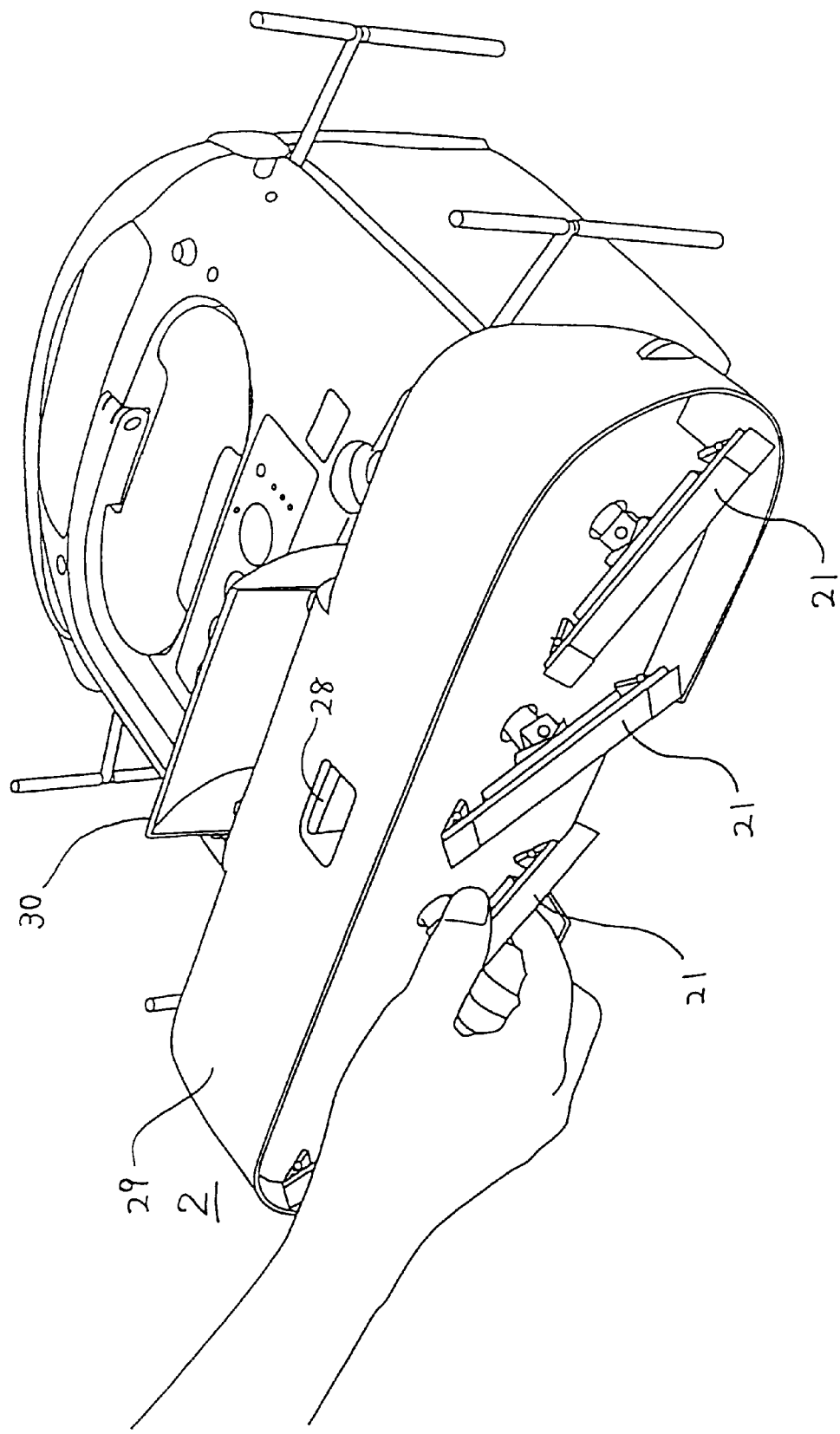

Referring to FIG. 12, rotary brush 21, which is exposed as working unit 2 including first cover 29, second cover 30 and lock canceling lever 28 rotated upward, is exchanged.

Figure 13:
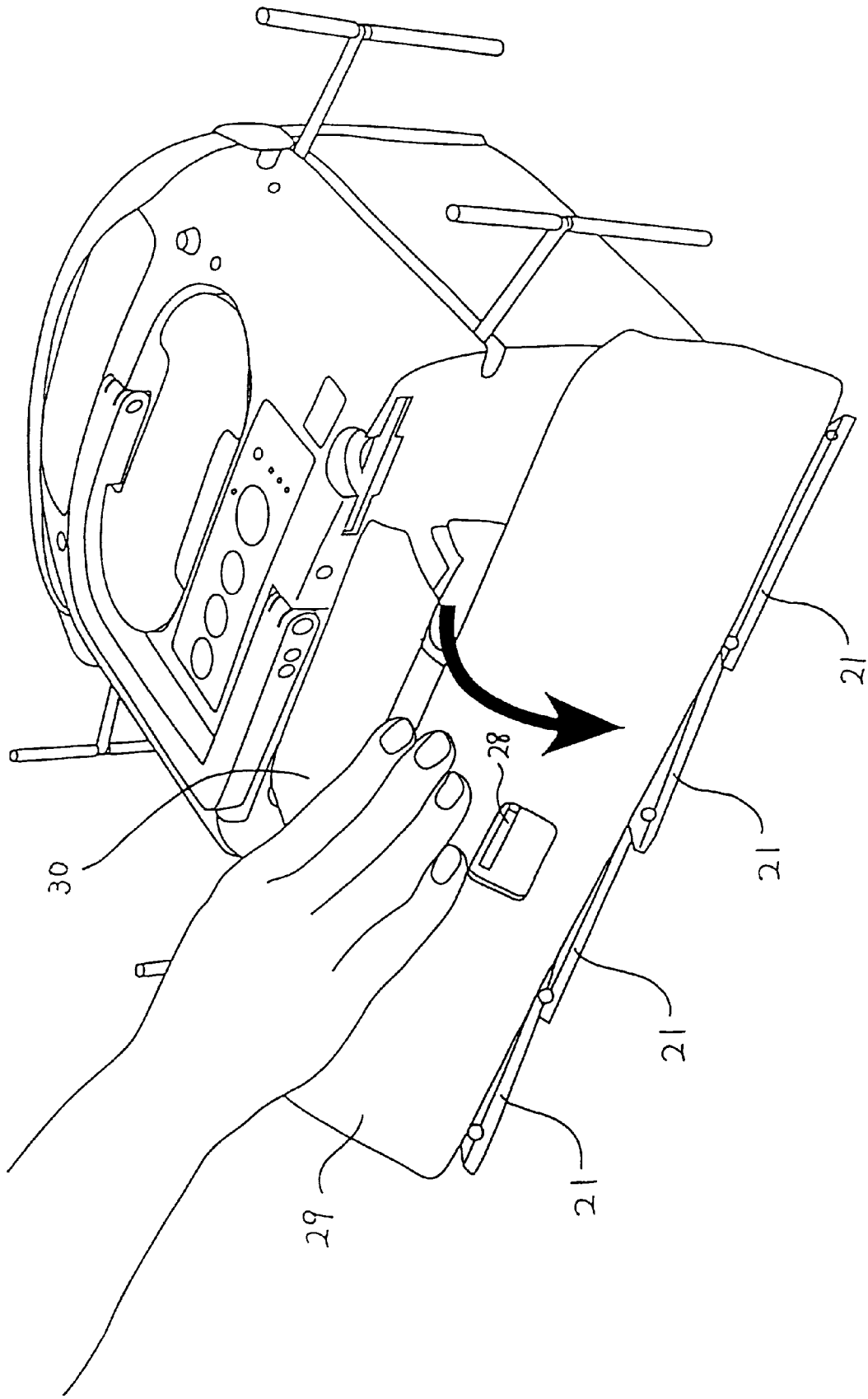

Referring to FIG. 13, after rotary brush 21 is exchanged, working unit 2 including first cover 29 and lock canceling lever 28 is pushed down by the operator. Thus, the second cover 30 also moves downward together with the first cover 29, lock member 26 is locked at coupling member 23, rotary brush 21 comes to be in contact with the bottom surface (FIG. 5) and fixed in a state enabling cleaning.

As described above, in the autonomous running and working robot of the present embodiment, working unit 2 includes spring 25 and lock member 26. Therefore, when rotary brush 21 for cleaning or the rotary cloth for waxing which is attached to working unit 2 and covered by the first cover 29 so that it is not easily viewed from the outside during operation is to be exchanged, the working unit 2 springs upward. Thus, the rear surface (working surface) of working unit 2 is exposed. Therefore, the component such as the rotary brush to be exchanged can be readily viewed and recognized, facilitating exchanging operation.

Further, since working unit 2 springs upward by the spring force, manual force is not necessary to push up the working unit 2. Even when the operator happens to let loose the unit, there is not a possibility of falling and damage to the working unit 2.

Further, the direction (upward direction) for operating lock canceling lever 28 is the same as the direction of spring of the working unit 2 (upward direction), and therefore operator can move his or her hand smooth for activating spring operation.

The first cover 29 has a notch so that it does not abut other member such as coupling member 23 and body 1 at the time of spring up. The notch is covered by the second cover 30 and the second cover 30 also springs upward when the first cover springs upward. Therefore, the first cover 29 can spring upward at a greater angle.

Further, as shown in FIGS. 6 and 7, by forming the buffer member using a resilient body such as rubber, external force and shock in every direction, that is, upward, downward, left, and right directions as well as torsion can be absorbed.

Further, a through hole is provided in the buffer member and pipes and lines such as hose 22, power supply line and signal line between the body and the working unit can be arranged through the through hole, and therefore the lines and pipes can be protected.

Figure 14:
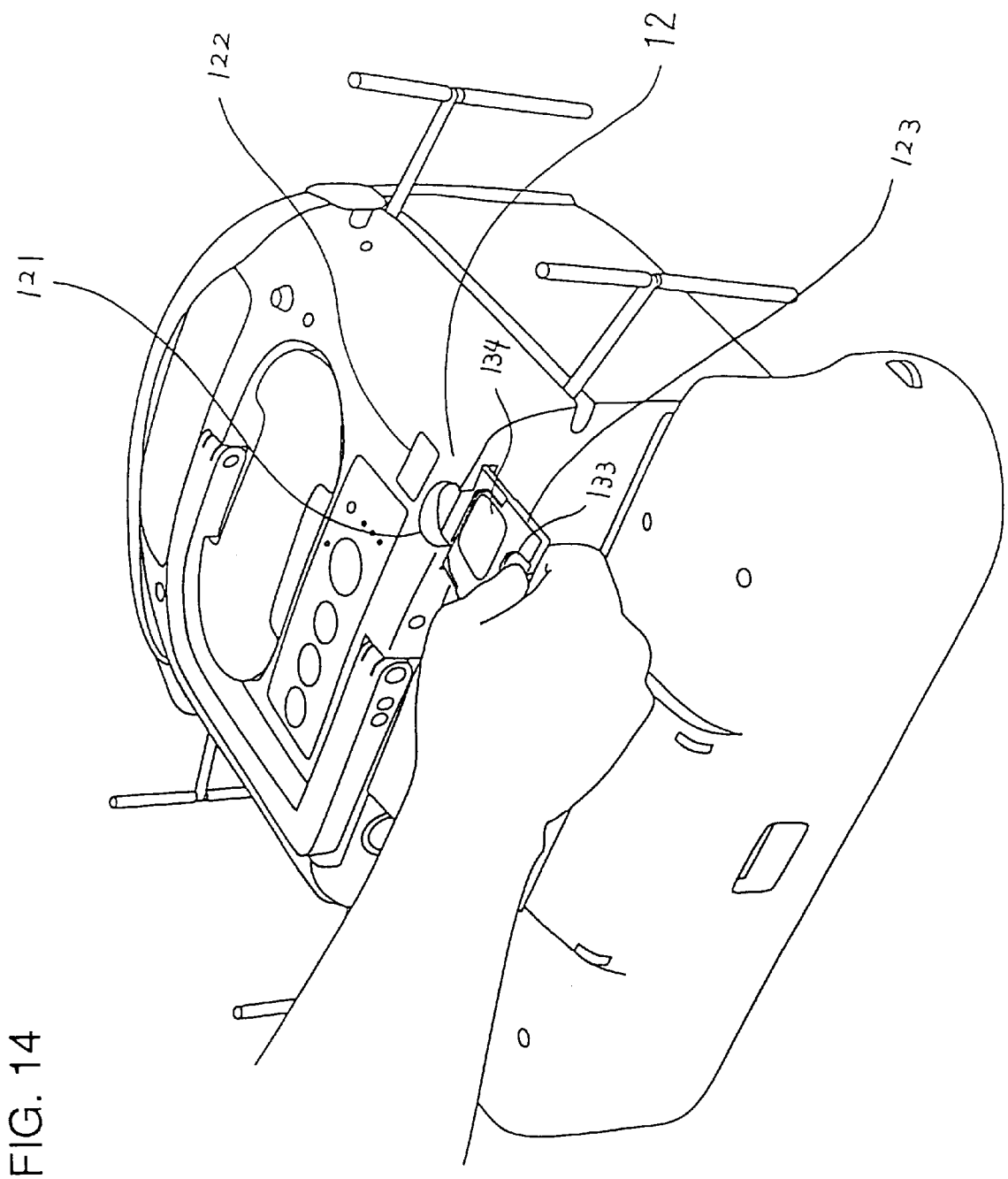
FIG. 14 is a perspective view showing an IC card mounting portion and an IC card for the autonomous running and working robot.

Referring to FIGS. 14 to 18, the IC card mounting portion provided on body 1 and the IC card will be described. FIG. 14 is a perspective view showing the IC card mounting portion and the IC card.

Referring to FIG. 14, an IC card 123 is mounted on IC card mounting portion 12 held by the operator's finger inserted through a through hole 133. At the time of mounting, IC card 123 is fixed at a position where a sticker 134 is placed below a window 122 and the through hole 133 is exposed at a notch 121.

IC card 123 is taken out from IC card mounting portion 12 by the operator inserting his or her finger to the through hole 133 exposed at notch 121 and pulling the card out.

Figure 15:
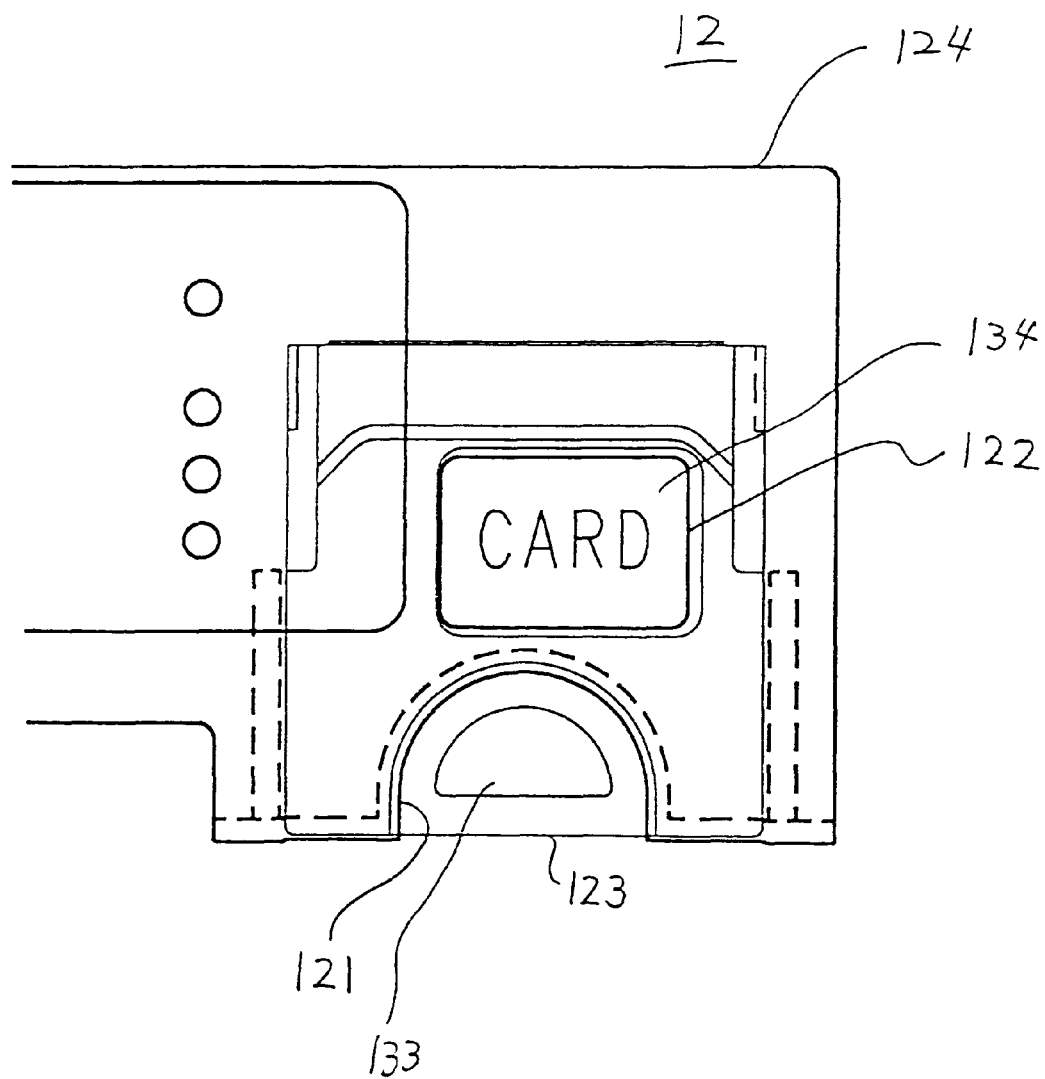
FIG. 15 is a plan view of the IC card mounting portion of the autonomous running and working robot.
Figure 16A:
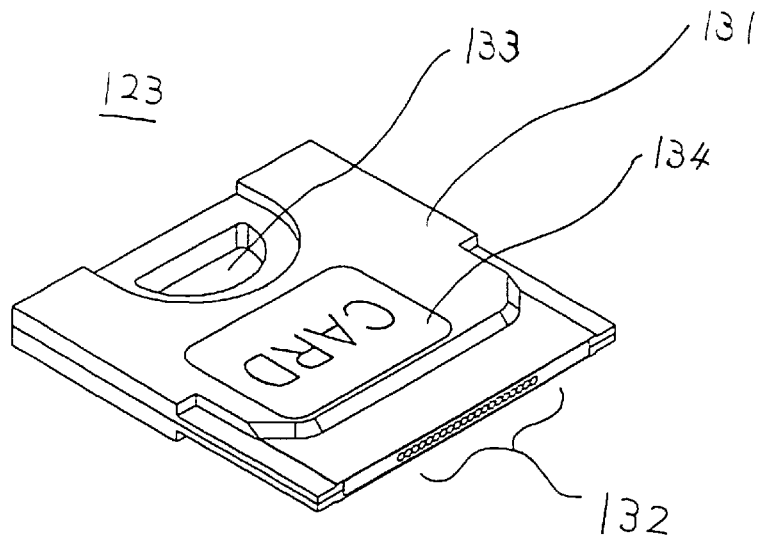
FIG. 16A is a perspective view of the IC card used for the autonomous running and working robot and FIG. 16B is a plan view thereof.
Figure 16B:
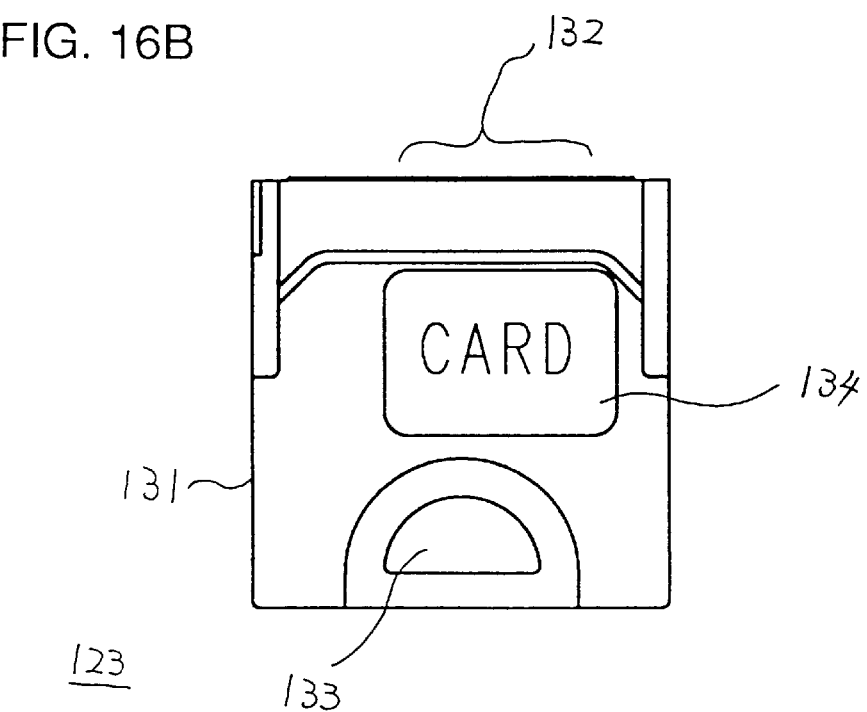

Referring to FIGS. 15 to 18B, the IC card mounting portion 12 shown in FIGS. 1 and 14 will be described in more detail. FIG. 15 is a plan view of the IC card mounting portion. FIG. 15 shows the IC card mounting portion 12 with IC card 123 mounted. FIG. 16A is a perspective view and FIG. 16B is a plan view of the IC card.

Referring to FIGS. 15 to 17, IC card 123 includes an electronic circuit, not shown, a card-shaped case 131 for protecting the electronic circuit, a connector 132 for detachably connecting the electronic circuit to the outside provided at one end of case 131, and a sticker 134 for writing comments related to the IC card, for example, thereon.

IC card mounting portion 12 includes a member 124 having a notch 121 at a position where through hole 133 of IC card 123 is exposed when IC card 123 is mounted. Member 124 has a window 122 at a position where sticker 134 of IC card 123 is exposed when IC card 123 is mounted.

The case 131 of IC card 123 has through hole 133 through which the operator's finger is inserted, at an end portion opposite to that end which is provided with connector 132.

Figure 17A:
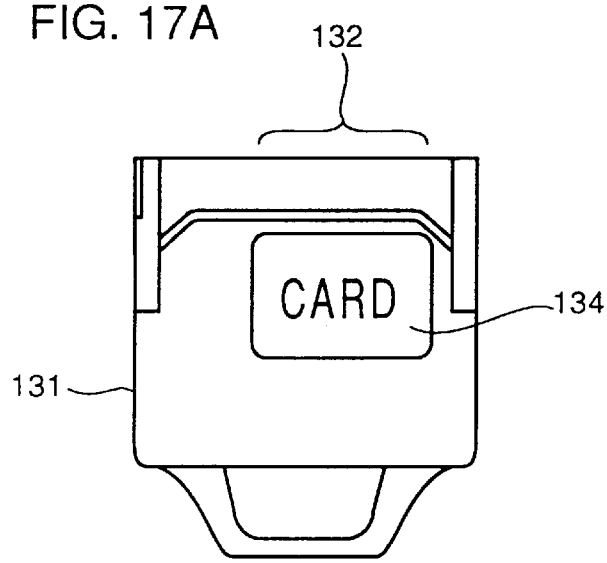
FIGS. 17A and 17B are plan views showing another example of the IC card used for the autonomous running and working robot.
Figure 17B:
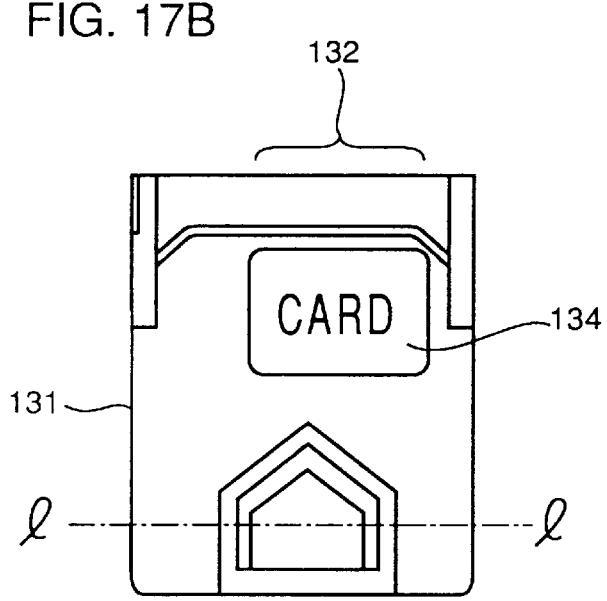
Figure 17C:
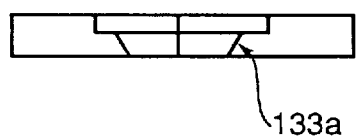
FIG. 17C is a cross section of a portion taken along the line 1—1 of FIG. 17B.

FIGS. 17A and 17B are plan views showing another example of IC card 123 and FIG. 17C is a cross section of FIG. 17B taken along the line 1—1. Referring to FIG. 17A, a portion forming a through hole is projected from the IC card toward the direction opposite to the connector. Referring to FIGS. 17B and 17C, the front and rear sides of IC card 123 can be readily distinguished by a step and a tapered surface 133a, and the hole indicates the direction of insertion.

Figure 18A:
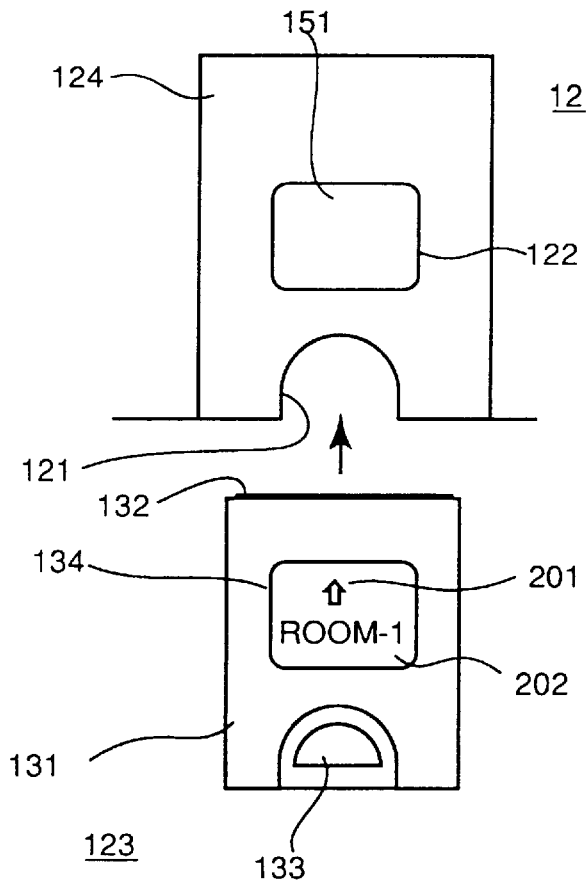
FIGS. 18A and 18B are plan views showing main portions of a first example of a window at the IC card mounting portion of the autonomous running and working robot.
Figure 18B:
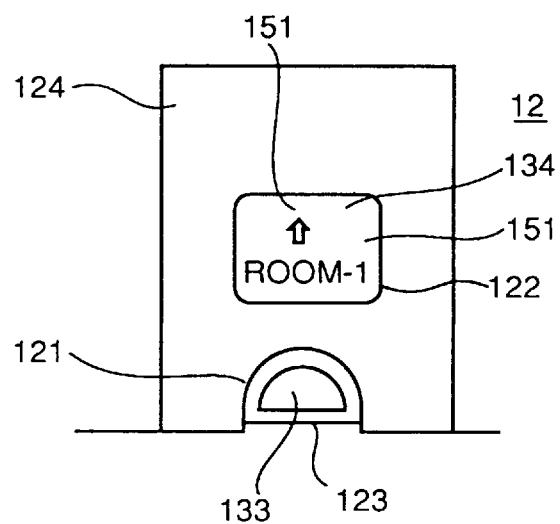

Referring to FIGS. 18A and 18B, window 122 of IC card mounting portion 12 shown in FIG. 15 will be described. FIGS. 18A and 18B are plan views showing a main portion of the first example of the window at the IC card mounting portion. FIG. 18A is a plan view of the main portion before mounting the IC card and FIG. 18B is a plan view of the main portion after mounting the IC card. Portions corresponding to those described with reference to FIGS. 15 to 17 are denoted by the same reference characters and detailed description thereof is not repeated.

Referring to FIGS. 18A and 18B, window 122 of IC card mounting portion 12 includes a transparent cover 151 fixed on member 124.

A mark 201 for preventing reverse insertion is provided on sticker 134 of IC card 123, and writing by a pencil, pen or the like is possible on the remaining comment portion 202 of the sticker. With reference to FIG. 18A, "ROOM-1" is written as an example of a comment. The content written on the sticker will be positioned below window 22 when IC card 133 is mounted.

As described above, according to the IC card mounting portion of the autonomous running and working robot of the present embodiment, when an IC card for storing data instructing operation procedure of the autonomous running and operating robot is to be used, an ejecting mechanism such as a lever is not necessary, and the IC card can be easily taken out by simply inserting one's finger through the through hole of the IC card and pulling out the card, and hence the size of the autonomous running and operating robot can be made smaller.

Further, it is possible to securely hold and take out the IC card without slipping even when the operator wears gloves, for example, when the robot is used in a clean room of a hospital. Further, the IC card can be hung on a hook on the wall using the through hole. This facilitates storage of IC card. This is more effective when IC cards having different contents for different rooms are prepared in order to optimize cleaning of respective rooms, as the cards can be hung on the wall of respective rooms.

Further, since the window is provided at the IC card mounting portion, the type of IC card can be identified after the IC card is mounted, and correct working area and working data corresponding to the operation of the robot can be provided.

Further, a mark showing the direction of insertion is provided at a prescribed portion of the IC card, allowing writing by a pencil, a pen or the like on the remaining part, erroneous insertion of the IC card can be prevented, and the card on which comments or the like is freely written by the user can be confirmed even after the IC card is mounted.

When the window is formed or covered by a transparent member, it provides dust proof and water proof. Meanwhile, if the window is open, it is possible to write on the IC card by a pen or the like even after the IC card is mounted.

Figure 19:
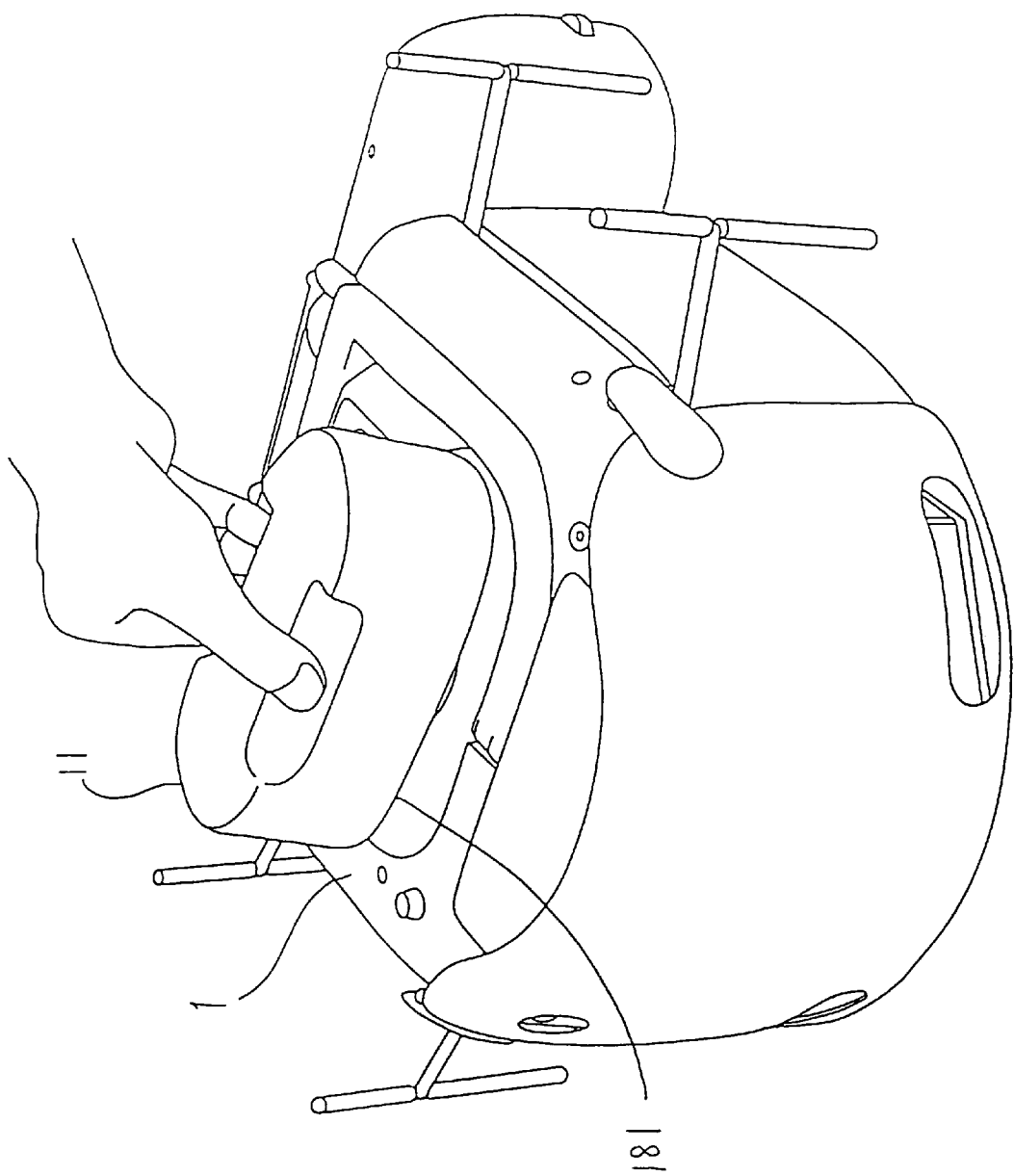
FIG. 19 is a perspective view showing how a tank is mounted on the autonomous running and working robot.
Figure 20:
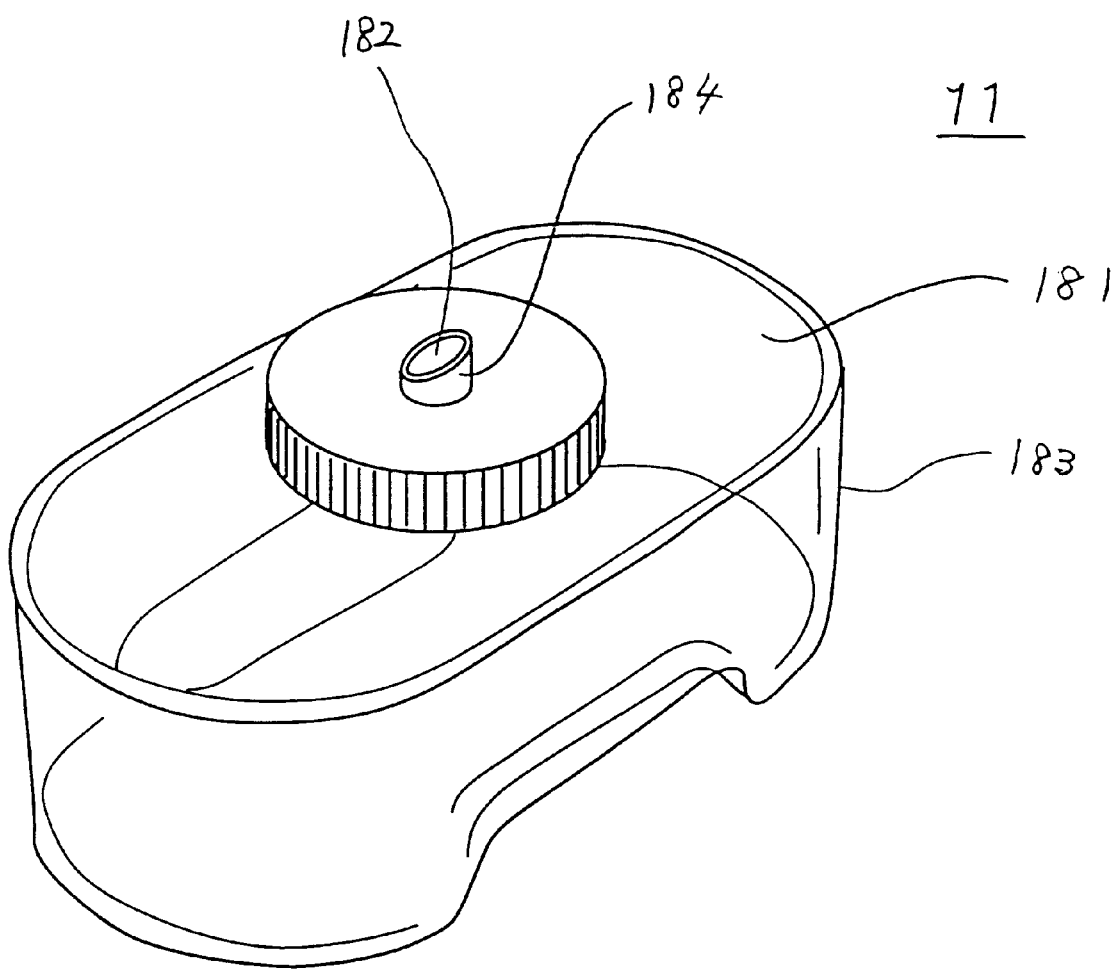
FIG. 20 is a perspective view of the tank of the autonomous running and working robot.
Figure 21:
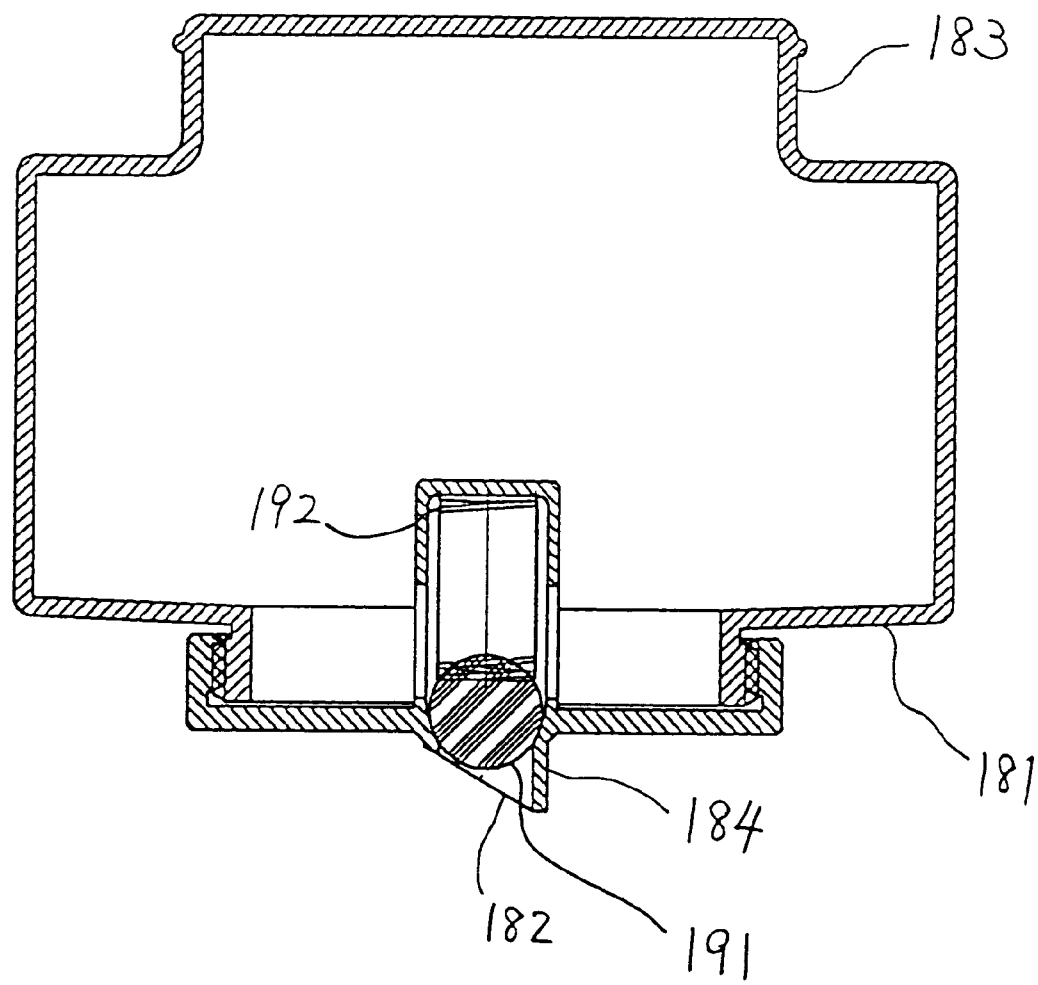
FIG. 21 is a cross section of the tank of the autonomous running and working robot.
Figure 22:
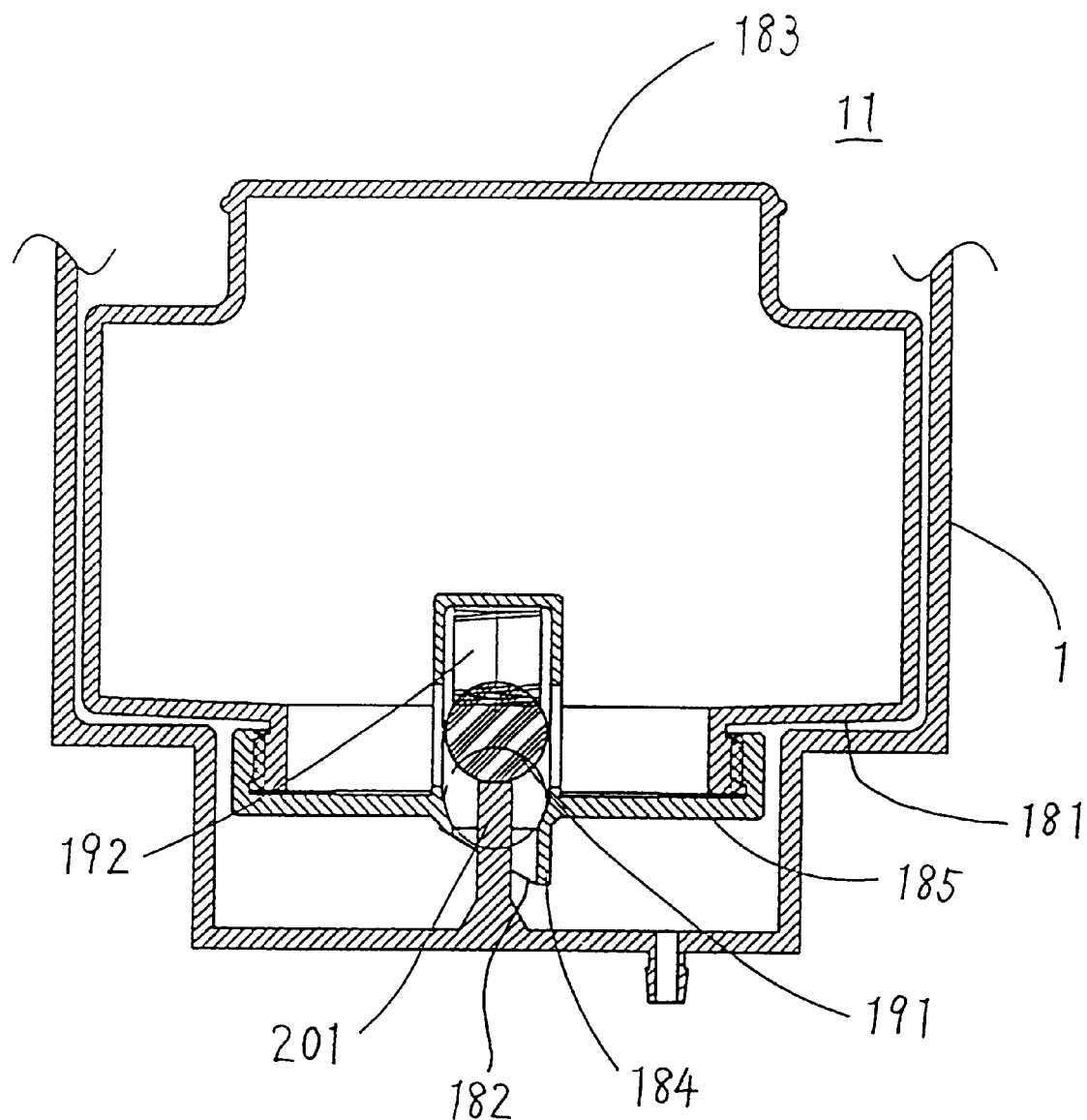
FIG. 22 is a cross section of the autonomous running and working robot when the tank is mounted.

Referring to FIGS. 19 to 23B, tank 11 shown in FIG. 1 will be described. FIG. 19 is a perspective view showing how the tank is attached. FIG. 20 is a perspective view of the tank, FIG. 21 is a cross section of the tank and FIG. 22 is a cross section when the tank is mounted.

Referring to FIGS. 19, 20 and 21, tank 11 includes a tank portion 183 for containing liquid with an opening 182 formed on a flat surface 181 which will be the bottom portion when used; a liquid dispensing member 184 having a cylindrical shape projecting outward from tank portion 183 from opening 182 at a right angle with respect to the flat surface 181, with its tip end cut diagonally with respect to the central axis of the cylinder and detachably fixed at the tank portion 183; a ball valve 191 for suppressing leakage of liquid contained in tank portion 183; and a spring 192 for urging ball valve 191 toward the opening 182.

Body 1 includes a valve shaft pin 201 for pushing up ball valve 191. Ball valve 191 has the diameter of about 12 mm, and valve push up pin 201 has the diameter of about 4 mm.

The operation of tank 11 provided on body 1 will be described. Referring to FIGS. 19, 20 and 22, tank 11 is mounted on body 1 such that surface 181 faces downward as the bottom surface and the valve push up pin 201 is received at opening 182. The ball valve 191 which has been closed by the urging of spring 192 is pushed up by valve push up pin 201, and hence it opens. When the tip end portion of liquid dispensing member 184 is cut vertical to the central axis of the cylinder, the liquid in the tank does not drop out from the tank because of surface tension of the liquid, in accordance with the limit of opening area of the cylinder and the surface tension. However, when the tip end portion is cut diagonally, balance of the surface tension is lost, and the liquid drops out of the tank because of gravity.

Figure 23A:
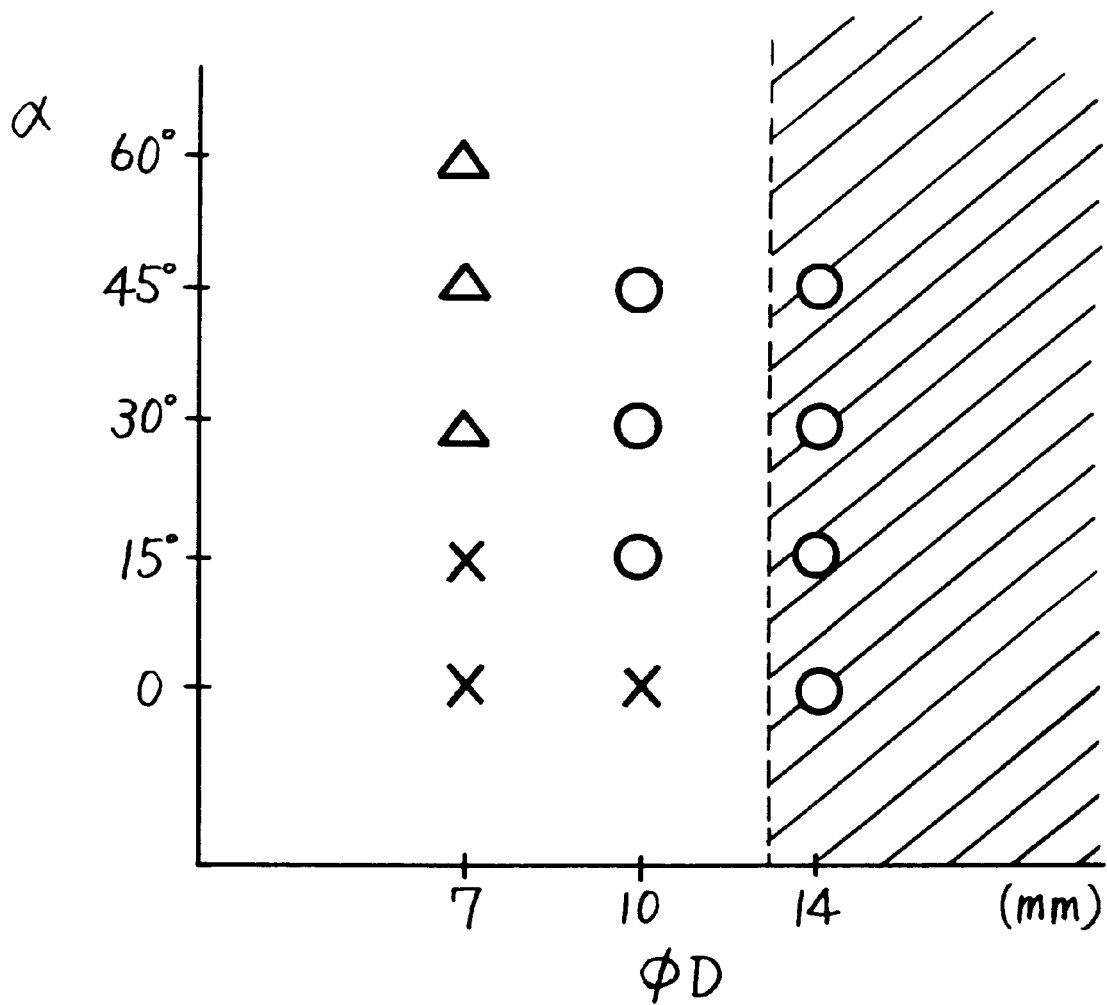
FIGS. 23A and 23B are graph showing results of experiment related to the shape of liquid dispensing member at the tank of the autonomous running and working robot.
Figure 23B:
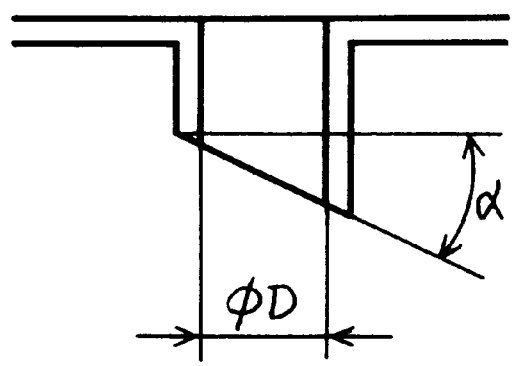

FIGS. 23A and 23B are graph showing the result of experiment related to the shape of the liquid dispensing member of the tank.

Referring to FIGS. 23A and 23B, when the diameter φD of the cylinder is 10 mm, the cutting angle α at the tip end portion of liquid dispensing member 184 should be at least 15° with respect to the orthogonal direction of the central axis of the cylinder. When the diameter φD is 7 mm, the effect is not provided even when the tip end is cut diagonally. When the diameter φD of the cylinder is 14 mm, liquid flows out of the tank regardless of the cutting angle. However, liquid leaks because of insufficient sealing. When spring force of the spring 192 is made higher for improved sealing, there would be a side effect such as lifting of the tank 11 itself, and therefore it is not practical.

The liquid used for the experiment was water at the temperature of 15° C. The surface tension thereof is 73.48 (dyn/cm) according to RIKANENPYO (ISBN 4-621-04266-1).

As described above, according to the tank of the present embodiment, as the tip end portion of the liquid dispensing member is cut diagonally, even a liquid having high surface tension can be dropped out from the tank through the liquid dispensing member.

Further, a valve is provided in the liquid dispensing member which is adapted to open when it is placed on the tank receiving portion of the body and closes when the tank is taken out, so that the liquid is not leaked when the tank is removed.

Further, the cylinder of the liquid dispensing member is provided on a cap which is fitted in the opening at the bottom surface of the tank. Therefore, it is not necessary to separately provide an opening for putting the liquid into the tank. Furthermore, since there is only one opening, the upper surface of the tank can be made flat and when the liquid is put into the tank, the tank can be placed upside down with the upper surface facing downward. Therefore, the tank can be placed stably.

Further, the spring force of the spring urging the valve is set to be little smaller than the weight of the tank. Therefore, even when the liquid in the tank is reduced or used up, the tank will not be lift up by the spring force.

The spring force is calculated in the following manner. When we represent the weight of the tank by T (180 g) and spring force when the tank is mounted on the robot by F, the following relation must be satisfied to prevent lifting of the tank:

$$T > F$$

When we represent spring constant by k and amount of compression of the spring by L, then $$F = kL$$

Therefore, the spring constant k and the amount of compression L must be set to satisfy T>kL. In the present embodiment, the values are set to k=4.6 gf/mm and L=32 mm. Namely, 180>4.6×3.2=147.2, thus the relation T>kL is satisfied.

FIGS. 24A and 24B show the second example of the structure of the coupling member described above. Referring to FIGS. 24A and 24B, coupling member 23 includes a buffer member 81 and support members 62 and 63. Buffer member 81 has a hollow rectangular shape. Support members 62 and 63 have holes of approximately the same size at a position corresponding to the hollow hole of buffer member 81. Therefore, coupling member 23 comes to have a through hole at this portion.

Since buffer member 81 has a rectangular shape, shock in the upward, downward, left and right directions can be absorbed uniformly. However, shock in the diagonal direction is not much absorbed. However, the shape of the buffer member 81 may be determined in accordance with the direction of the shock to be absorbed.

FIGS. 25A and 25B shows the third example of the structure of the coupling member. Referring to FIGS. 25A and 25B, buffer member 23 includes two rectangular buffer members 91 and support members 62 and 63.

Figures 26A, 26B:
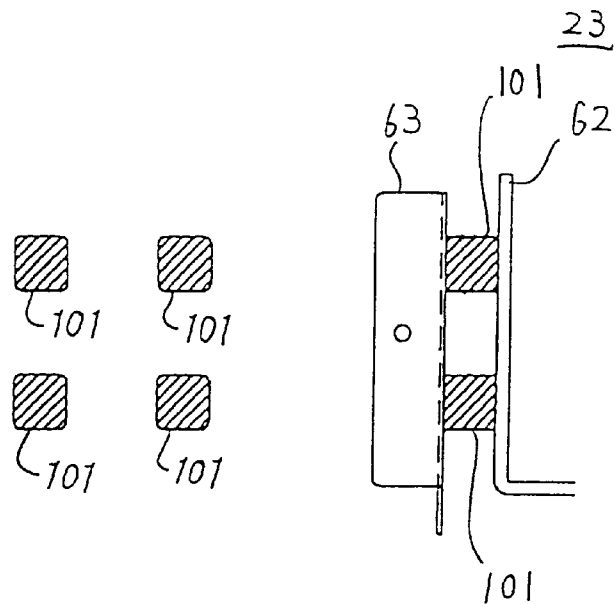
FIGS. 26A and 26B show a fourth example of the structure of the coupling unit for the autonomous running and working robot.

FIGS. 26A and 26B show the fourth example of the structure of the coupling member. Referring to FIGS. 26A and 26B, buffer member 23 includes four rectangular buffer members 101 and support members 62 and 63.

Buffer member including a number of buffer members such as shown in FIGS. 25 and 26 are also helpful in a absorbing shock.

Figure 27:
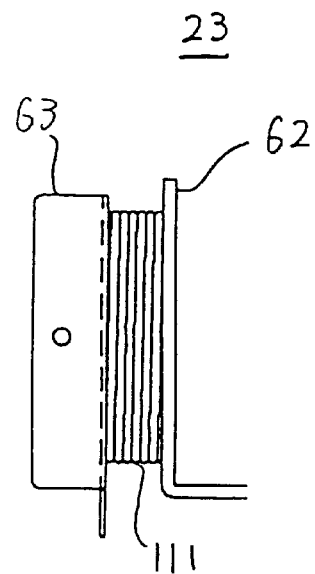
FIG. 27 shows a fifth example of the structure of the coupling unit for the autonomous running and working robot.

FIG. 27 shows the fifth example of the structure of the coupling member. Referring to FIG. 27, coupling member 23 includes a spring 111 and support members 62 and 63.

The buffer members shown in FIGS. 6, 7 and 24A to 27B must have flexibility, absorb shock, have sufficient strength to hold working unit 2 and must be less susceptible to aging. Rubber, plastic (for example, urethane or engineering plastics) may be used as the material for the buffer members shown in FIGS. 6, 7 and 24A to 26B. In the present embodiment, chloroprene (Neoprene) having compression spring constant of 450 kgf/mm, shear spring constant of 90 kgf/mm, rubber hardness (JISA) of about 42 is used.

Figure 28:
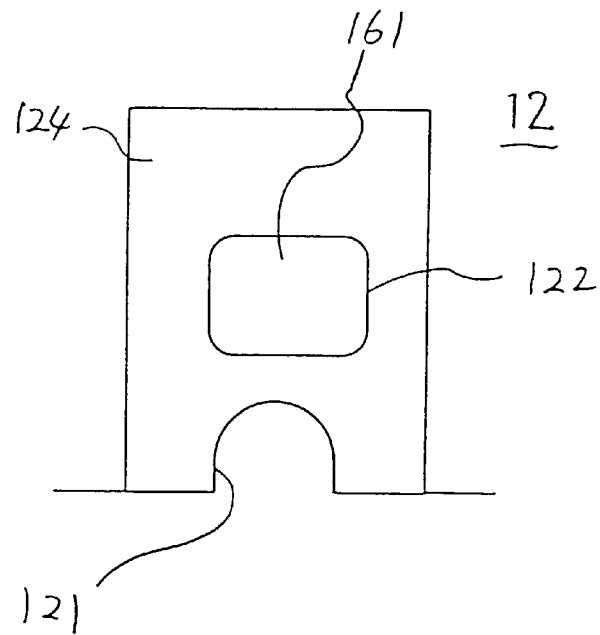
FIG. 28 is a plan view of a main portion showing a second example of the window at the IC card mounting portion of the autonomous running and working robot.

FIG. 28 is a plan view of a main portion showing a second example of the window at the IC card mounting portion described above.

Figure 29:
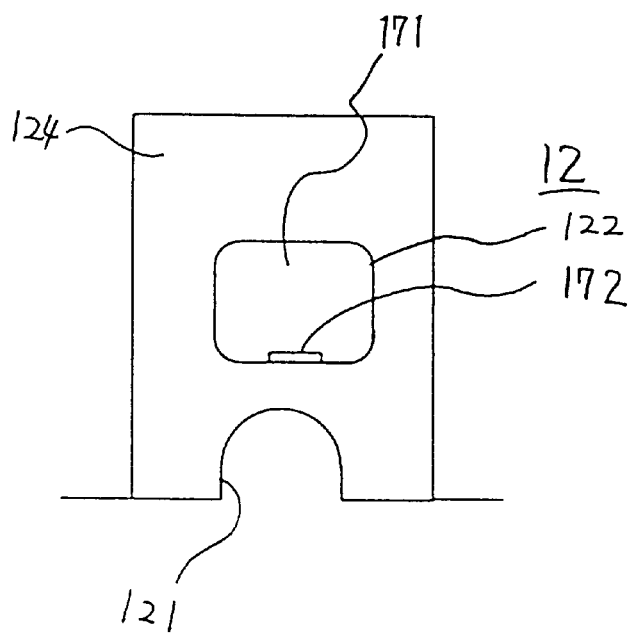
FIG. 29 is a plan view showing a main portion of a third example of the window at the IC card mounting portion of the autonomous running and working robot.

FIG. 29 is a plan view of a main portion showing a third example of the window at the IC card mounting portion. Referring to FIG. 28, window 122 of IC cassette mounting portion has an opening 161.

Referring to FIG. 29, window 122 of IC cassette mounting portion 12 includes a transparent opening/closing lid 171 attached to be opened/closed on member 104, and an opening/closing knob 172 for opening or closing the transparent lid 171.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An IC card, comprising:
   an electronic circuit having a semiconductor memory; and
   a thin card-shaped plastic case with a through hole, wherein said through hole is unsealed, and wherein said case directly protects said electronic circuit.

2. The IC card according to claim 1, wherein said plastic case has at one end a connector for connecting to another apparatus, and said through hole is provided near a side opposing to the connector.

3. The IC card according to claim 1, wherein said through hole provides a mark indicating direction of insertion of the IC card.

4. The IC card according to claim 1, wherein said through hole is provided with a step at a wall surface of the hole, distinguishing front and rear surfaces of the IC card.

5. The IC card according to claim 4, having an indication portion indicating content of the card at a surface of said plastic case.

6. The IC card according to claim 1, wherein said through hole has a tapered wall surface of the hole distinguishing front and rear surfaces of the IC card.

7. The IC card according to claim 1, wherein said through hole has sufficient size to allow one's finger to be inserted therethrough for taking out the IC card when the IC card is mounted.

8. The IC card according to claim 1, wherein said through hole is formed inside a rectangular IC card.

9. The IC card according to claim 1, wherein said through hole is formed at a portion projecting from a rectangular IC card.

10. An apparatus to which an IC card is mounted, comprising:
    a mounting opening to which said IC card is mounted, wherein said IC card includes an electronic circuit having a semiconductor memory and a thin card-shaped plastic case with a through hole, wherein said through hole is unsealed, and wherein said case directly protects said electronic circuit;
    a communication mechanism for reading information stored in said IC card; and
    a card mounting position provided such that said through hole is exposed when said IC card is mounted.

11. The apparatus to which the IC card is mounted according to claim 10, wherein
    said through hole is exposed by providing a notch at a portion of said mounting opening.

12. The apparatus to which an IC card is mounted according to claim 10, wherein
    said apparatus autonomously runs based on the information stored in the IC card.

13. The apparatus to which an IC card is mounted according to claim 12, wherein
    said apparatus is a cleaning robot for cleaning based on a running path stored in the IC card.

14. The apparatus claim 12, comprising a window, and when an IC card having an indicating portion indicating content of the card provided on a surface of a case is mounted, said indicating portion can be viewed from the window.

* * * * *